United States Patent
Angilivelil et al.

(10) Patent No.: US 8,190,519 B1
(45) Date of Patent: May 29, 2012

(54) ELECTRONIC GIFTING

(75) Inventors: Aby T. Angilivelil, Issaquah, WA (US); Imtiaz Ahmed, Issaquah, WA (US); Prasanna P. Subash, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 745 days.

(21) Appl. No.: 12/241,892

(22) Filed: Sep. 30, 2008

(51) Int. Cl.
*G06Q 40/00* (2012.01)

(52) U.S. Cl. ........................................ 705/39

(58) Field of Classification Search .............. 705/14, 705/26, 26.8, 27, 27.1, 27.2, 39, 40, 41; 235/379–383
See application file for complete search history.

(56) References Cited

U.S. PATENT DOCUMENTS

| | | | | |
|---|---|---|---|---|
| 6,633,849 B1 * | 10/2003 | Dodd | | 705/26.35 |
| 7,412,411 B2 * | 8/2008 | Horel et al. | | 705/26.8 |
| 7,418,407 B2 * | 8/2008 | Giannini | | 705/26.8 |
| 7,761,344 B2 * | 7/2010 | Smith | | 705/26.2 |
| 7,792,705 B2 * | 9/2010 | Bezos et al. | | 705/26.81 |
| 7,831,439 B1 * | 11/2010 | Bryar et al. | | 705/1.1 |
| 7,881,971 B1 * | 2/2011 | Nguyen et al. | | 705/26.8 |
| 7,908,179 B2 * | 3/2011 | Karas et al. | | 705/26.1 |
| 7,925,546 B2 * | 4/2011 | Jacobi et al. | | 705/26.8 |
| 2002/0026377 A1 * | 2/2002 | Takahashi | | 705/26 |
| 2002/0095298 A1 * | 7/2002 | Ewing | | 705/1 |
| 2002/0138363 A1 * | 9/2002 | Karas et al. | | 705/26 |
| 2005/0044005 A1 * | 2/2005 | Giannini | | 705/26 |
| 2005/0091120 A1 * | 4/2005 | Auletta | | 705/26 |
| 2006/0149681 A1 | 7/2006 | Meisner | | |
| 2006/0206486 A1 * | 9/2006 | Strickland | | 707/9 |
| 2007/0038931 A1 | 2/2007 | Allaire et al. | | |
| 2007/0143189 A1 * | 6/2007 | Mitchem | | 705/26 |
| 2007/0156594 A1 | 7/2007 | McGucken | | |
| 2007/0203788 A1 * | 8/2007 | Andalib et al. | | 705/14 |
| 2008/0004984 A1 * | 1/2008 | Sendo et al. | | 705/26 |
| 2008/0092181 A1 | 4/2008 | Britt | | |
| 2008/0172306 A1 * | 7/2008 | Schorr et al. | | 705/26 |

OTHER PUBLICATIONS

PRwire; "Matchmaker.com Creates Business Development Unit for Gift Sales"; Jan. 20, 2000: pp. 1 and 2.*
"GiftCardSwapping.com"; http://web.archive.org/web/20070520051410/http://www.giftcardswapping.com/; Sunday, May 20, 2007; p. 1.*
"Gift Card Exchange, Buy Gift Card, Discount Gift Cards, Cash Gift Card Swap"; http://web.archive.org/web/20080724163511/http:giftcardrescue.com/; Apr. 12, 2008-Jul. 11, 2011; pp. 1-3.*
"CBLS.www.cbls.com.(World Web Watch)."; Advanced Materials & Processes, v160, n6; Jun. 2002; p. 1.*
"Eugene Science"; Edgar Online; May 23, 2006; pp. 1-5.*
Mathieu, Elizabeth; "Opinion: Delaware: An unparalleled home for your trust"; Private Asset Management, v5, n20; Oct. 5, 1998; pp. 1 and 2.*

(Continued)

*Primary Examiner* — Ella Colbert
(74) *Attorney, Agent, or Firm* — Knobbe, Martens, Olson & Bear LLP

(57) ABSTRACT

Systems, methods, and computer-readable media for sending and receiving gifts including specified, electronically-deliverable electronically transferrable items are disclosed. A system includes a data store that stores electronically transferrable items available to be purchased as gifts. The system also includes a computing device in communication with the data store. The computing device is operative to receive a selection by a giver of a specified electronically transferrable item to be presented to a recipient as a gift. The computing device is further operative to charge a payment mechanism associated with the giver after the recipient has accepted the gift.

27 Claims, 10 Drawing Sheets

OTHER PUBLICATIONS

US Fed News Service, Including US State News;"Publication No. WO/2009/109949 Published on Sep. 11, Assigned to France Telecom for Electronic Gifting System (American Inventor)"; Sep. 15, 2009; p. 1.*

* cited by examiner

ELECTRONIC GIFTING

I. BACKGROUND

Electronic transfer has become a prominent method for distributing media content and other electronically transferrable items. Electronically transferrable items may include, for example, electronically accessible services or digital media content such as songs, ringtones, movies, magazines, books, and other content. The electronically transferrable items can be accessed on computers, as well as on portable media players or home audiovisual systems using set top boxes or other devices. In downloading or streaming the electronically transferrable items from a network, such as the Internet, consumers can select and access desired electronically transferrable items in minutes or seconds. Thus, consumers can enjoy the electronically transferrable items without leaving their homes to purchase or rent physical media storing the electronically transferrable items and without waiting for delivery of physical media, such as via the mail.

The prospect of electronically transferrable items offers an alternative to conventional methods of giving gifts that might include music, movies, television programs, games, or books. For example, instead of giving a gift certificate for a retail store that would allow a recipient to select a gift of the recipient's own choosing, one can give a gift certificate for electronically transferrable items. Using the gift certificate, the recipient can conveniently access the desired electronically transferrable items. However, when a giver presents a gift certificate for electronically transferrable items, the gift may be considered impersonal because the giver did not take the time to choose a specific gift for the particular recipient. Also, it is not unusual for a gift certificate not to be redeemed by a recipient, wasting the money the giver spent on the gift certificate.

II. BRIEF DESCRIPTION OF THE DRAWINGS

Figure 12:
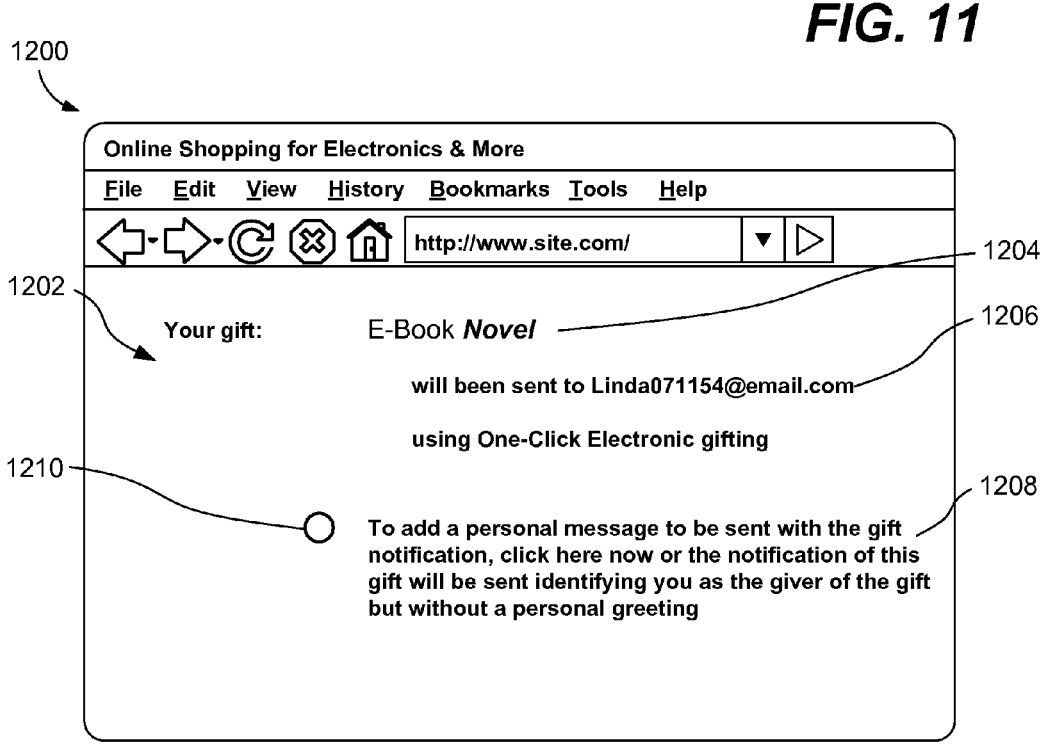
Figure 13:
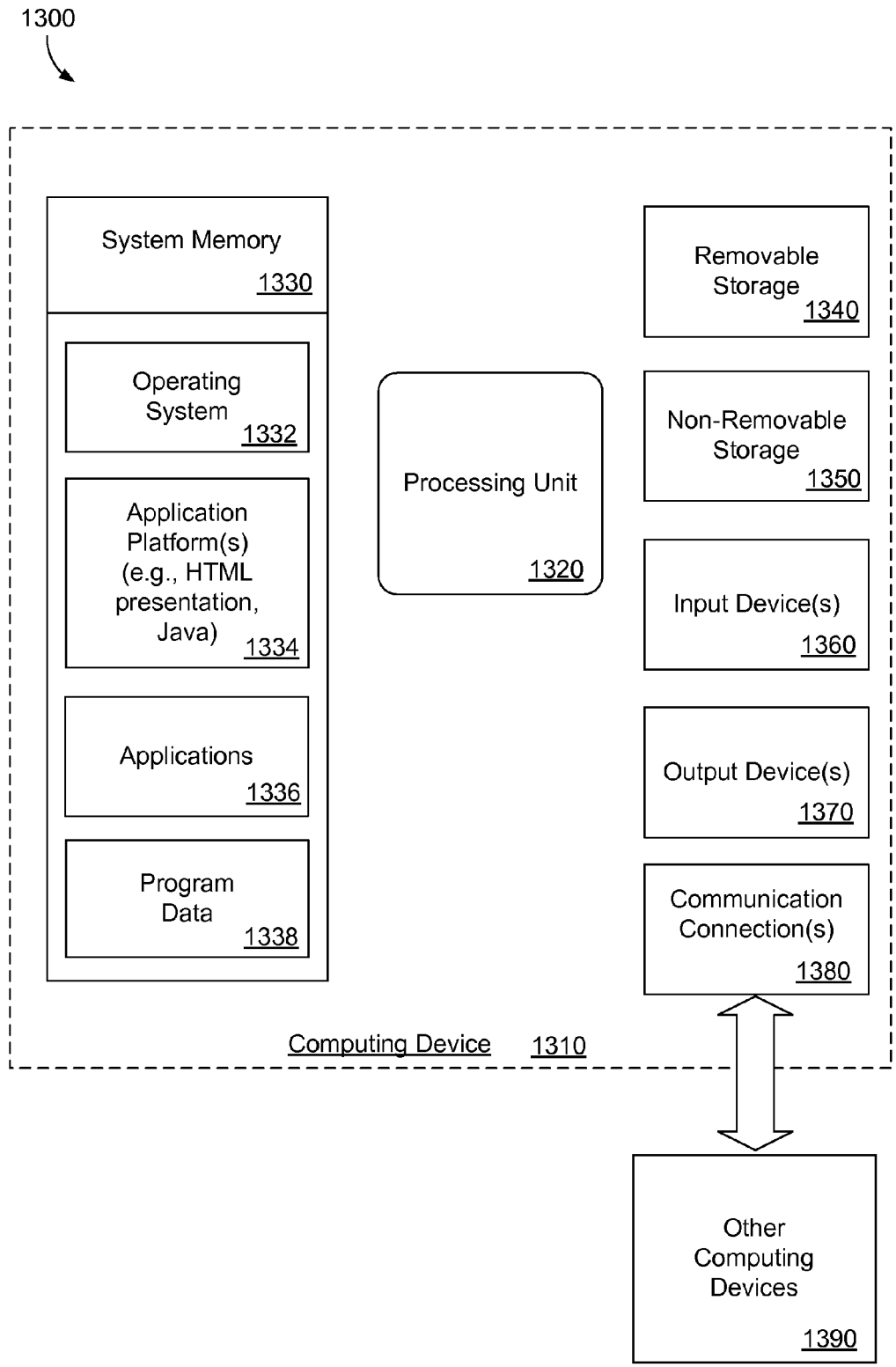

FIG. 12 depicts an illustrative embodiment of a user interface displaying a confirmation message that a notification of a specified electronically transferrable item selected with a single input has been generated for presenting a gift; and FIG. 13 is a block diagram of a general purpose computer system to support embodiments of computer-implemented methods, computer-readable media, and computer program products according to the present disclosure.

III. DETAILED DESCRIPTION

Illustrative embodiments are disclosed for sending and receiving gifts that include specified electronically transferrable items, such as songs, ringtones, movies, magazines, books, games, and other content, or other electronically accessible items or services. In enabling a giver to make a gift of specified electronically transferrable items, embodiments disclosed herein enable the giver to choose a particular song, ringtone, movie, magazine, book, game, or other electronically transferrable item for electronic delivery to a recipient. As a result, a giver can choose a specified gift, rather than send the recipient a gift credit or a gift certificate that the recipient may apply to a purchase. In other words, the giver can give a specified gift of the giver's own choosing, rather than just provide the recipient with a monetary credit to spend as the recipient sees fit.

According to illustrative embodiments, a giver accesses a network resource (e.g., a Web site) that sells electronically-deliverable media items. The media items may be electronically delivered by downloading, streaming, or another form of electronic delivery or transfer. The giver chooses a specified electronically transferrable item and the network resource generates a gift notification that is sent to the recipient. The gift notification may be sent electronically or may be generated as a printable object that may be physically delivered to the recipient. The gift notification informs the recipient of the specified electronically transferrable item selected by the giver. The gift notification also includes an access mechanism, such as a code or a link that enables the recipient to access the network resource to access the specified electronically transferrable item. The recipient may accept the gift by choosing, for example, to immediately download or otherwise secure electronic delivery of the specified electronically transferrable item or to accept the specified electronically transferrable item but defer electronic delivery until a later time. The recipient may also choose to exchange the specified electronically transferrable item, to give the specified electronically transferrable item to a third party, or to refuse the gift. Once the recipient accepts the gift in some form, a payment method submitted by the giver is then charged for the gift. Confirmation may also be sent to the giver to confirm that the recipient has accepted the gift.

Figure 1:
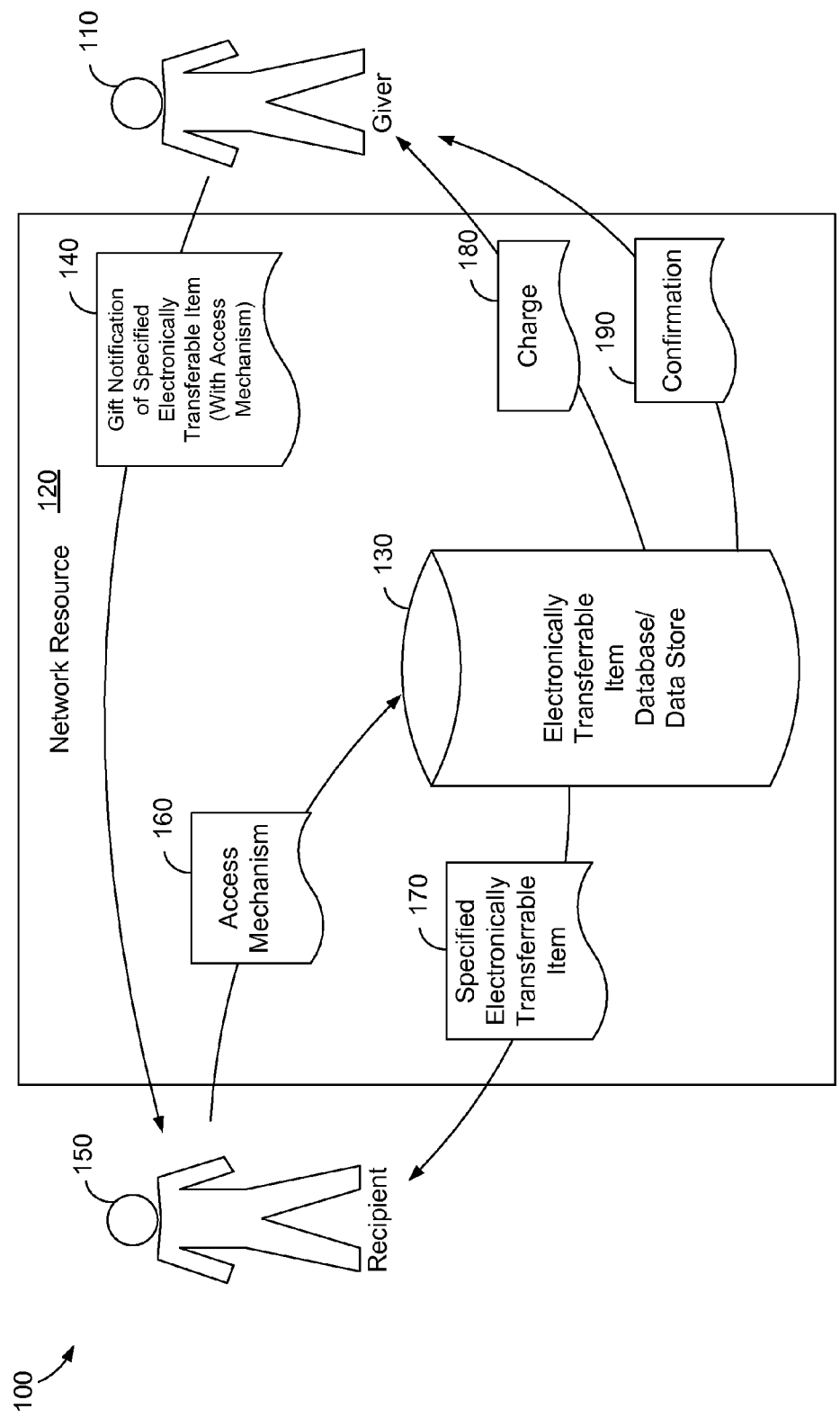
FIG. 1 is a block diagram providing an overview of an illustrative embodiment of electronic gifting.

FIG. 1 is a block diagram of a system, generally designated 100, allowing a giver 110 to present a specified electronically transferrable item 170 as a gift.

The giver 110 of the gift may select the specified electronically transferrable item 170 from a network resource 120 that maintains a database or data store of electronically transferrable items 130. The database of electronically transferrable items 130 may include a library of digital media items as well as access mechanisms to other electronically transferrable items. The giver 110 is able to select the specified electronically transferrable item 170 to send to a recipient 150, rather than send a gift certificate or a gift credit to the recipient 150. Upon selecting the specified electronically transferrable item 170, a gift notification 140 of the specified electronically transferrable item is generated for presentation to the recipient 150. The gift notification 140 may include an electronic message (e.g., electronic mail message, voice message, text message, etc.), or a printable message that may be physically delivered to the recipient. The gift notification 140 includes an access mechanism, such as a code or a link, in the case of an electronically-delivered gift notification. Once the recipient 150 receives the gift notification 140, the recipient 150 may present the access mechanism 160 to the network resource 120, such as by presenting the code to the network resource 120 via a user interface or selecting the link, to accept the specified electronically transferrable item 170. The recipient 150 can accept the gift regardless of whether the recipient 150 holds an account with the network resource 120 and without providing a payment mechanism to the network resource 120. The specified electronically transferrable item 170 is made available to the recipient 150 as a one-time delivery that may be downloaded or streamed. After the recipient 150 accepts the specified electronically transferrable item 170, a charge 180 is posted to a payment mechanism of the giver for the cost of the specified electronically transferrable item 170. A confirmation 190 is sent to the giver 110 to indicate acceptance of the specified electronically transferrable item 170.

According to an illustrative embodiment, a system includes a network resource that maintains an electronic gift component. The electronic gift component includes a processor configured to enable a giver to select a specified digital media item as a gift. The specified digital media item is electronically deliverable from the network resource. The processor is further configured to generate a gift notification to be presented to the recipient. The gift notification includes an access mechanism allowing the recipient to accept the gift. The processor is configured to respond to the access mechanism to enable acceptance of the gift and to make the gift available for electronic delivery to the recipient. After the acceptance of the gift, the processor is configured to post a charge to a payment mechanism associated with the giver. A payment processing component is configured to receive the charge from the electronic gift component and to process the charge.

According to another illustrative embodiment, a method enables a giver to select a specified electronically transferrable item to be presented as a gift. The specified electronically transferrable item is electronically deliverable from a network resource. A gift notification is generated for presentation to the recipient. The gift notification includes an access mechanism allowing the recipient to accept the gift. The recipient is enabled to accept the gift as a one-time delivery without requiring the recipient either to hold an account with the network resource or to provide a payment mechanism to the network resource. The method determines whether the gift has been accepted. When the gift has not been accepted, the giver may cancel the gift. On the other hand, when the gift has been accepted, a charge is posted to a payment mechanism associated with the giver.

According to still another embodiment, a computer-readable medium having computer-executable components enables a giver to give a gift using a single input. For example, the computer-executable components include an electronic gift component configured to enable a giver to access a network resource to select a gift for a recipient from a wish list of the recipient. In this embodiment, the giver and the recipient hold accounts with the network resource. The giver account is associated with a payment mechanism. The wish list associated with the recipient account includes at least one electronically transferrable item electronically deliverable from the network resource. A selection component is configured to make the wish list available to the giver as a list of selectable gift options. A selection indicator is associated with the at least one electronically transferrable item. The selection component is further configured to determine when the giver uses a single input to select the at least one electronically transferrable item as the gift. A gift notification component is configured to notify the recipient of the gift. An acceptance component is configured to receive an input from the recipient to enable the recipient to accept the gift. A payment processing component is configured to charge the payment mechanism of the giver after the recipient accepts the gift.

According to another embodiment, a computer-readable medium having computer-executable components enables a recipient to accept a specified electronically transferrable item as a gift. The computer-executable components include an acceptance component configured to receive an access mechanism enabling the recipient to accept the gift. The gift includes a specified electronically transferrable item that is electronically deliverable from a network resource. The acceptance component is further configured to determine when the recipient has accepted the gift. A payment processing component is configured to charge a payment mechanism associated with a giver of the gift when the recipient has accepted the gift.

Figure 2:
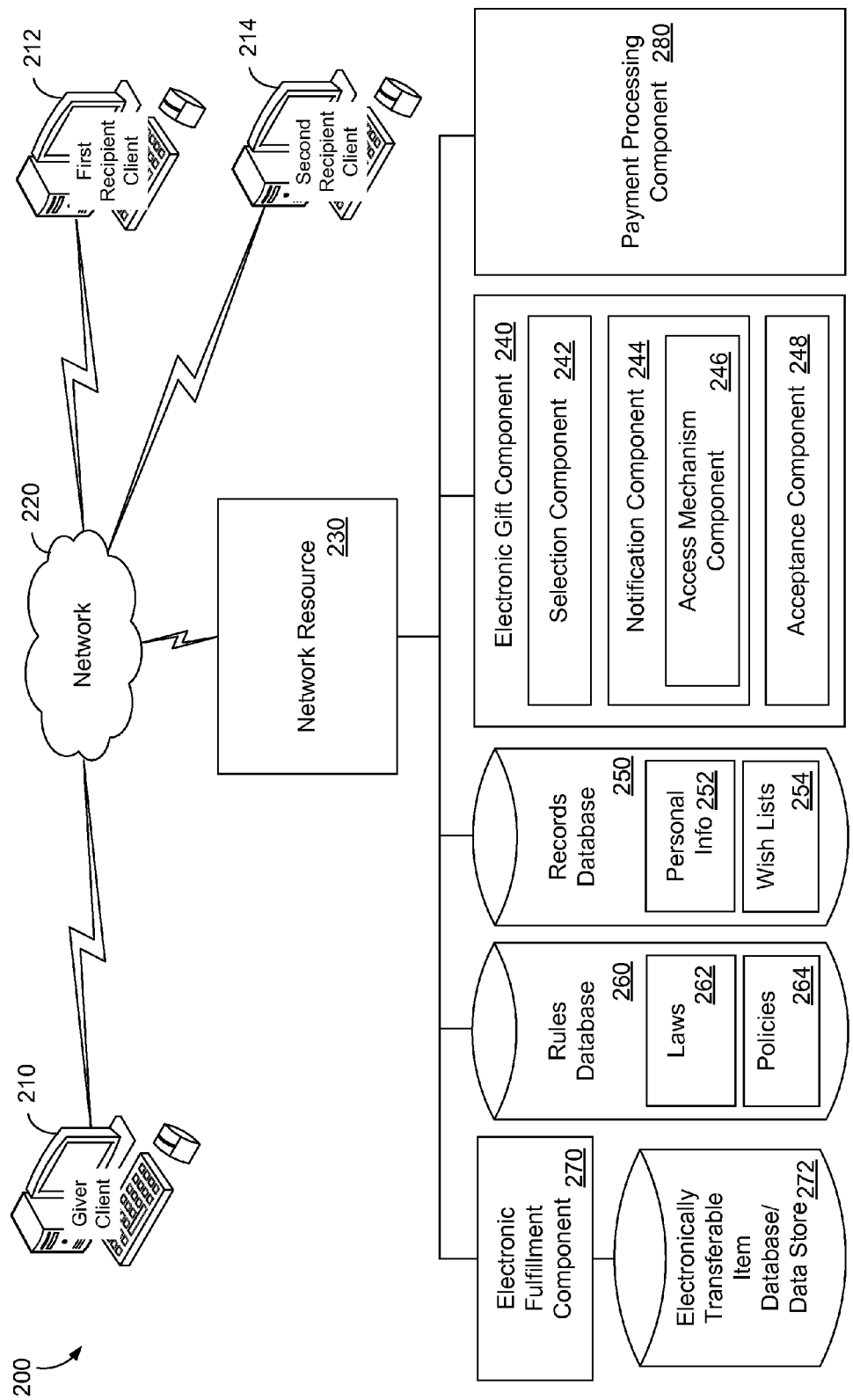
FIG. 2 is a block diagram of an illustrative embodiment of a system enabling sending and receiving of electronically transferrable items as gifts.

FIG. 2 shows an illustrative embodiment of a system, generally designated 200, utilized to perform sending and receiving of electronically transferrable gifts. The system 200 includes a plurality of client computing systems 210-214 that communicate via a network 220, such as the Internet, with a network resource 230 from which a specified electronically transferrable item, electronically deliverable from the network resource, is selected as a gift. The electronically transferrable item may include digital media content, such as songs, videos, movies, ringtones, games, or electronic books (e-books), other electronically accessible items, such as electronic gift cards and electronic gift certificates, or other electronically-accessible services, such as subscriber services enabling access to network-based programs, network-based storage, and other services. The client computing systems 210-214 each may include a nonportable computing device, such as a desktop computer or a television equipped with a network-enabled set-top box, or a portable computing device, such as a notebook computer, handheld computer, a mobile telephone, or network-capable media player, electronic book reader or other presentation device.

Each of the client computing systems 210-214 may access the network 220 using a wired connection, such as a dial-up connection, digital subscriber line connection, cable connection, or other Ethernet or wired connection. Each of the client computing systems 210 may also access the network 220 using a wireless connection provided by IEEE 802.11 Wi-Fi connections, WiMax connections, cellular telephony, or other forms of wireless communication. Those skilled in the art will appreciate that the network 220 may be any wired network, wireless network or combination thereof. In addition, the network 220 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The network resource 230 may allow a giver, who accesses the network resource from a giver client computing system 210, to select a specified electronically transferrable item from the network resource 230 to be presented as a gift. A recipient may accept the gift via a first recipient client computing system 212. Alternatively, as further described below, the recipient may forward the gift to a third party who may accept the gift from a second recipient client computing system 214. As another alternative, the giver may send a gift using the first client computing system 210 to multiple recipients who may accept their respective gift using respective recipient client computing systems 212 and 214. The giver may enable all of the multiple recipients to accept the gift or may set an acceptance limit that specifies that only one or more of the multiple recipients may accept the gift on a first-come, first-served basis.

The network resource 230 is coupled to an electronic gift component 240, a records data store 250, a rules data store 260, an electronic fulfillment component 270, and a payment processing component 280. In making a gift of a specified electronically transferrable item, as further described below, when the recipient accepts the gift, the electronic fulfillment component 270 enables the respective recipient client computing system 212 or 214 to access the electronically transferrable item content over the network 220 from an electronically transferrable item database or data store 272 coupled to the electronic fulfillment component 270.

In one particular embodiment, the electronic gift component 240 includes a selection component 242, a notification component 244, and an acceptance component 248. The selection component 242 enables the giver to select a specified electronically transferrable item to be presented to the recipient as a gift. The selection component 242, as further described below, may be used to select a gift for a recipient who does not hold an account with the network resource 230. On the other hand, the selection component 242 may access the records data store 250 that maintains personal information 252 that may provide relevant information about the recipient. The personal information 252 may be used to determine an address at which the recipient can be notified of the gift. In addition, the personal information 252 may be used along with a rules data store 260 to determine if a particular gift is appropriate for the recipient. For example, the personal information 252 may be used to determine if the recipient is of sufficient age to receive a specified electronically transferrable item according to laws 262 or policies 264 maintained in the rules data store 260. As a further example, the personal information 252 and the rules data store 260 may be used to determine if a specified electronically transferrable item is available in a format that is usable in an area where the recipient resides.

The selection component 242 also may access wish lists 254 maintained in the records data store 250 to allow the giver to determine if the recipient has identified one or more electronically transferrable items that the recipient may wish to receive. In such a case, where the giver and the recipient each have accounts with the network resource, and a payment mechanism is associated with the giver, the giver may select a specified electronically transferrable item to be presented to the recipient as a gift with a single input, as further described below with reference to FIG. 5.

The electronic gift component 240 also includes a notification component 244. When a specified electronically transferrable item has been selected by the giver using the selection component 242, the notification component 244 generates a notification to the recipient to inform the recipient of the gift. The notification may be an electronic message, such as an e-mail, text message, a voicemail message, or other electronic message. Alternatively, the notification may be a printable or printed notification that can be physically delivered to the recipient. The notification component 244 includes an access mechanism component 246 that is configured to include an access mechanism in the notification that enables the recipient to accept the gift. The access mechanism may include a code that the recipient may submit to the network resource 230 to receive the gift. Alternatively or additionally, the access mechanism may include a link or similar resource identifier that directs the recipient to a location of the network resource 230 from which the recipient may accept the gift. In an electronic notification, the code or the link may be electronically selectable. In a printable or printed notification, the recipient may manually enter the code or enter the link to accept the gift.

The electronic gift component 240 also includes an acceptance component 248. The acceptance component 248 is configured to receive the access mechanism submitted by the recipient and is configured to authorize the electronic fulfillment component 270 to make the specified electronically transferrable item available for electronic delivery from the electronically transferrable item database or data store 272 to the recipient. The electronic fulfillment component 270 enables the specified electronically transferrable item to be electronically delivered via downloading, streaming, or another delivery process. The recipient may select an option to have the specified electronically transferrable item electronically delivered immediately or an option to have the specified electronically transferrable item delivered at a later time. Also, as further described below with reference to FIG. 4, the acceptance component 248 also may enable the recipient to redirect the gift to a third party, exchange the gift, or simply refuse the gift. The acceptance component 248 is further configured to engage the payment processing component 280 to post a charge for the gift after the gift has been accepted. The acceptance component 248 also may be configured to send a confirmation message to the giver after the gift has been accepted.

Figure 3:
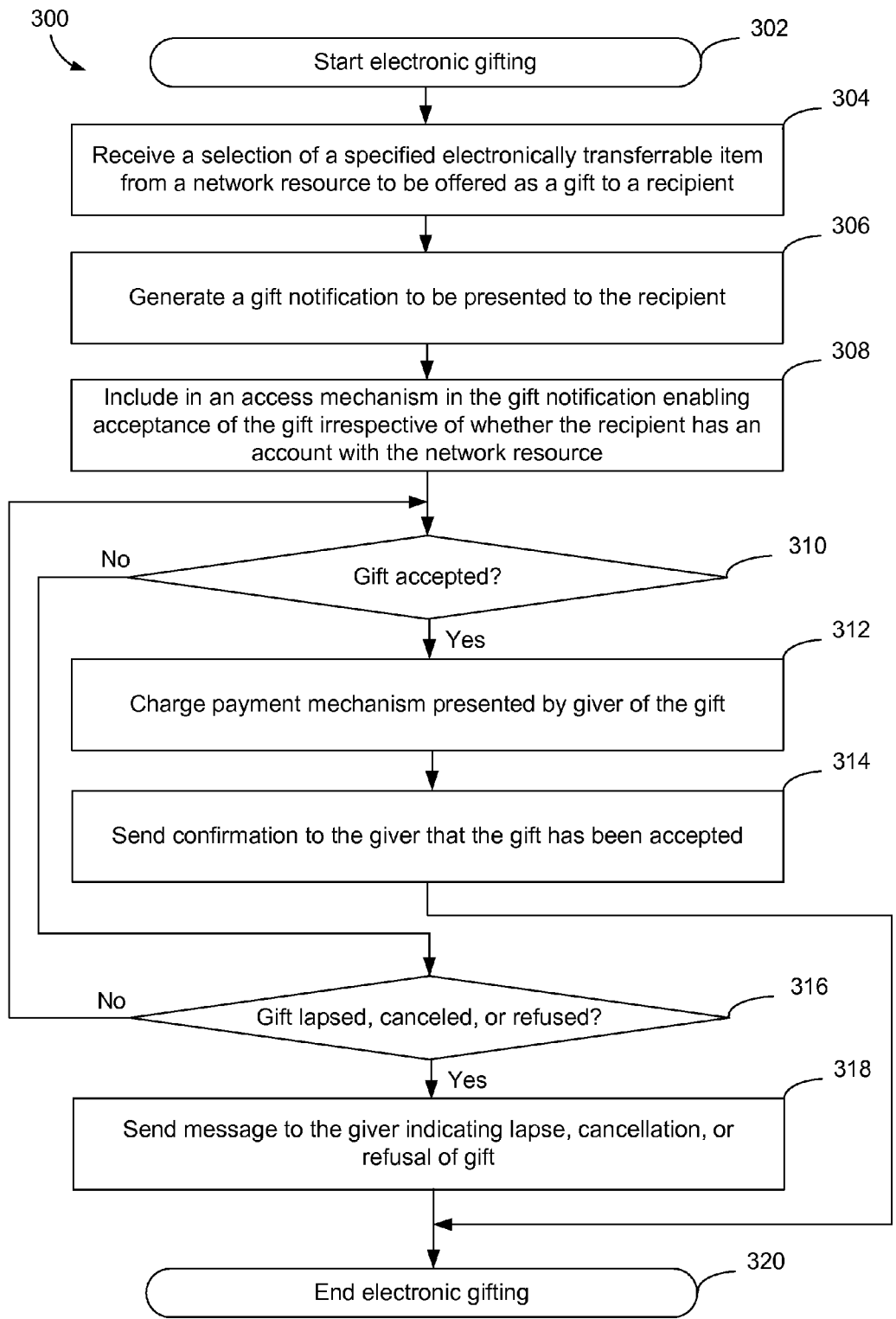
FIG. 3 is a flow diagram of an illustrative embodiment of a method of electronic gifting.

FIG. 3 is a flow diagram 300 of a first illustrative embodiment of a method of performing electronic gifting. For purposes of illustration, it will be assumed that a system, such as the system 200 of FIG. 2, performs the method described by the flow diagram 300, as well as the methods described by the flow diagrams 400-600 of FIGS. 4-6. However, differently configured systems also may be used to enable or perform the methods described by the flow diagrams 300-600. Thus, use of the system 200 to perform the methods described by the flow diagrams 300-600 is described by way of illustration, not by way of limitation.

At 302, a method of giving a specified electronically transferrable item or "electronic gifting" begins. At 304, the system receives a selection of a specified electronically transferrable item available for electronic delivery from a network resource. The specified electronically transferrable item will be offered as a gift to a recipient. At 306, the system generates a gift notification to be presented to the recipient. The gift notification may include an electronic communication, such as an electronic mail (e-mail) message, a text message, or another form of electronic message. Alternatively, the gift notification may include a printable or printed message, such as a certificate for the specified electronically transferrable item, to be physically delivered to the recipient or electronically delivered to the recipient and then printed. At 308, the system includes an access mechanism in the gift notification that enables the recipient to accept the gift. In one illustrative embodiment, the access mechanism enables the recipient to accept the gift regardless of whether to recipient holds an account with the network resource from which the gift has been made.

At 310, the system determines whether the gift has been accepted. If so, a payment mechanism associated with the giver of the gift is charged for a cost of the gift at 312. The payment mechanism may include a credit card account, a debit card account, checking account, a savings account, a previously-funded credit established with the network resource, or another payment mechanism. As a result, the giver of the gift is not charged for the gift until the gift has been accepted. At 314, the system sends a confirmation to the giver that the gift has been accepted and then electronic gifting ends at 320.

On the other hand, if the system determines at 310 that the gift has not yet been accepted, at 316, the system determines whether the gift has lapsed, has been canceled, or has been refused. Some embodiments may specify a time limit within which the gift is to be accepted by the recipient. The time limit may be specified as a period of time or as a deadline at a future point in time. The time limit may be included in the gift notification to inform the recipient by when he or she must accept the gift. Including such a time limit, for example, may ensure that the recipient does not accept a gift after a payment mechanism submitted by the giver has expired or may ensure that the giver is not charged for the gift at some future time when the giver no longer contemplates being charged for the gift. Alternatively, the giver may choose to cancel the gift. According to one embodiment, up until a time when the gift is accepted, the giver may change his or her mind and cancel the gift. As another alternative, the recipient may choose to refuse the gift. If the system determines at 316 that the gift has lapsed, has been canceled, or has been refused, at 318, the system sends a message to the giver indicating the lapse, cancellation, or refusal of the gift, and then electronic gifting ends at 320. On the other hand, if the system determines at 316 that the gift has not lapsed, has not been canceled, and has not been refused, the system returns to 310 and again determines whether the gift has been accepted.

Figure 4:
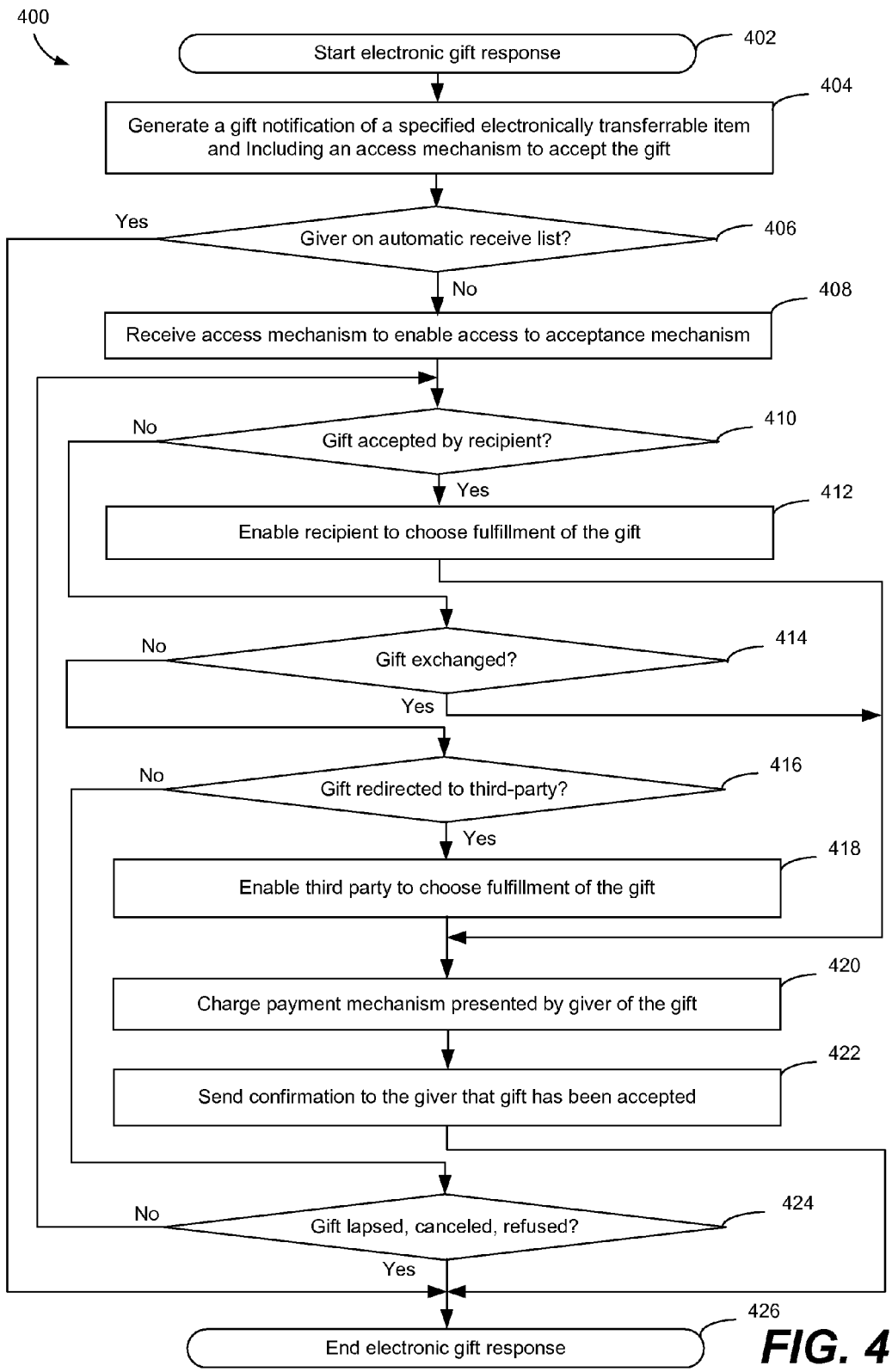
FIG. 4 is a flow diagram of an illustrative embodiment of a method of responding to an electronically transferrable gift.

FIG. 4 is a flow diagram 400 of an illustrative embodiment of a method of responding to an electronically transferrable gift. Again, for purposes of illustration, it will be assumed that a system, such as the system 200 of FIG. 2, performs the method described by the flow diagram 400. As previously described, for purposes of illustration, it will be assumed that a system, such as the system 200 of FIG. 2, performs the method described by the flow diagram 400. However, differently configured systems also may be used to enable or perform the methods described by the flow diagram 400.

At 402, an electronic gift response begins. At 404, a gift notification is generated that identifies a specified electronically transferrable item and submits an access mechanism that a recipient may use to accept the gift. As previously described, the gift notification may include an electronic notification or a printed notification. At 406, the system determines if the giver is included on an automatic accept list of the recipient. If the recipient holds an account with the network resource, the recipient may include a list of persons from whom the recipient will automatically accept gifts. Automatic acceptance, for example, may permit electronically transferrable items sent by the listed individuals to be automatically delivered to a media device. If system determines at 406 that the giver is included on the automatic accept list, the gift will be accepted, and electronic gift response ends at 426.

However, if the recipient does not have an account with the network resource or it is otherwise determined that the giver is not included on the automatic accept list at 406, at 408, the access mechanism is received to enable the recipient to access the acceptance mechanism and, thus, accept the gift. As previously described, the access mechanism may include a code or a link that, upon being selected by the recipient within an electronic communication or upon being otherwise submitted to the network resource, enables the recipient to accept the gift.

At 410, the system determines whether the gift has been accepted by the recipient. If so, at 412, the system enables the recipient to choose fulfillment of the gift, for example, by immediate electronic delivery or by delivery at later time. After the recipient chooses fulfillment of the gift at 412, at 420, a payment mechanism submitted by the giver of the gift is charged for a cost of the gift. At 422, the system sends a confirmation to the giver that the gift is been accepted, then, at 426, the electronic gift response ends.

On the other hand, if the system determines at 410 to the gift is not been accepted by the recipient, at 414, the system determines whether the gift has been exchanged. The specified electronically transferrable item included in the gift may be exchanged for another item available from the network resource that has a same or lower cost than the specified electronically transferrable item. Alternatively, the recipient may exchange specified electronically transferrable item for a credit with a network resource having a value equal to the cost of the specified electronically transferrable item. If the system determines at 414 that the gift has been exchanged, at 420, the system charges the payment mechanism of the giver for the value of the gift. At 422, the system sends confirmation to the giver that the gift has been accepted, then, at 426, the electronic gift response ends.

However, if the system determines at 414 the gift is not been exchanged, at 416, the system determines if the gift has been redirected to a third-party. A gift may be redirected to a third-party for example, by delivering the gift notification to the third-party. The third-party then may use the access mechanism within the gift notification to accept the gift. If the system determines at 416 that the gift has been redirected to the third-party, at 418, the system enables the third-party to choose fulfillment of the gift. At 420, the system charges the payment mechanism of the giver for the value of the gift. At 422, the system sends confirmation to the giver that the gift has been accepted and then, at 426, the electronic gift response ends.

However, if the system determines at 416 that the gift is not redirected to a third-party, at 424, the system determines whether the gift has lapsed, has been canceled, or has been refused. If not, the system reverts to 410 to determine if the gift has yet been accepted by the recipient. On the other hand, if the gift has lapsed, has been canceled, or has been refused, at 426, the electronic gift response ends.

Figure 5:
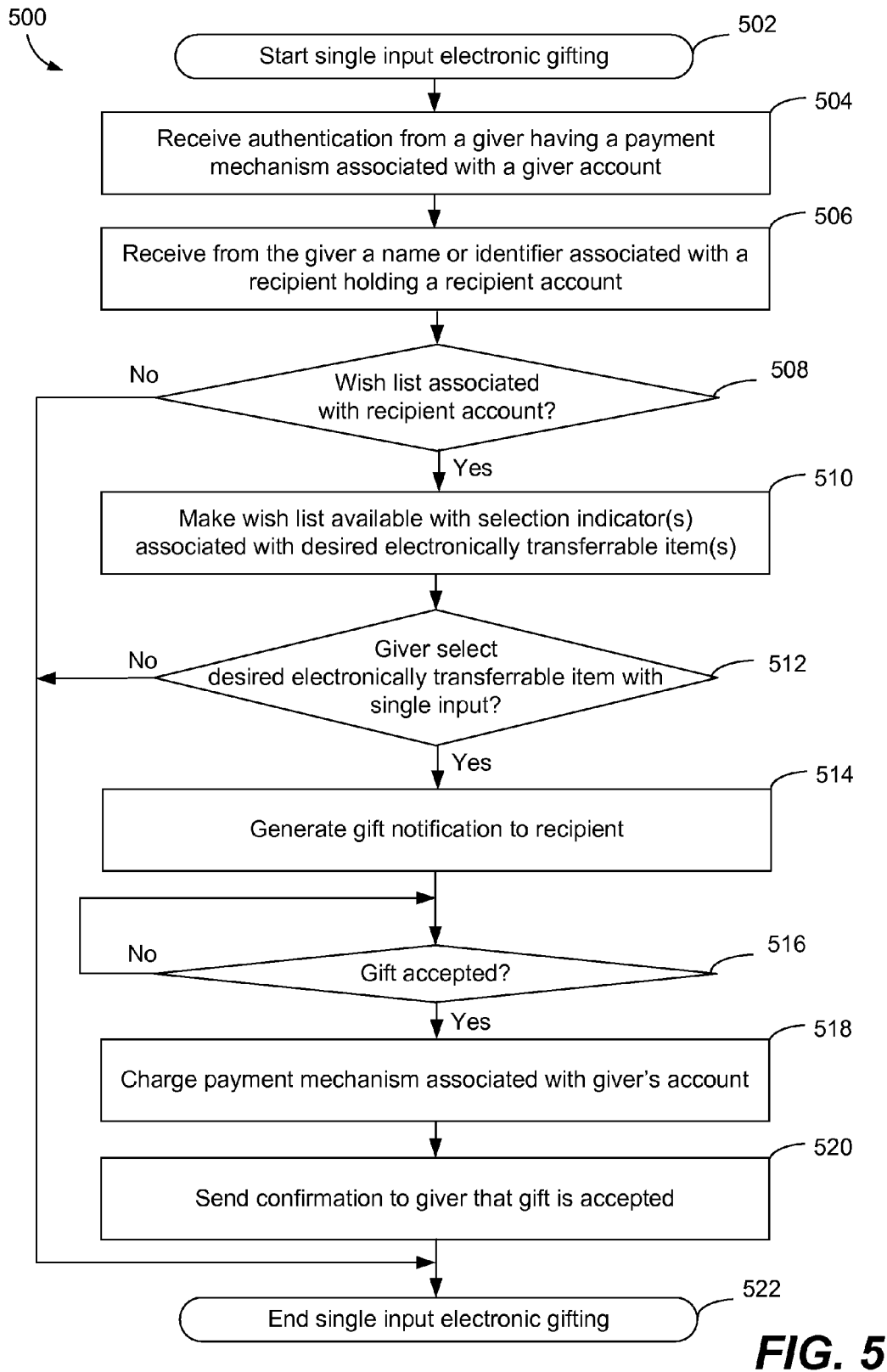
FIG. 5 is a flow diagram of an illustrative embodiment of a method of single input electronic gifting.

FIG. 5 is a flow diagram 500 of an illustrative embodiment of a method of single input electronic gifting. Again, for purposes of illustration, it will be assumed that a system, such as the system 200 of FIG. 2, performs the method described by the flow diagram 500. As previously described, for purposes of illustration, it will be assumed that a system, such as the system 200 of FIG. 2, performs the method described by the flow diagram 500. However, differently configured systems also may be used to enable or perform the methods described by the flow diagram 500.

At 502, single input electronic gifting begins. At 504, the system receives authentication from a giver having a payment mechanism associated with a giver account. The giver may provide authentication, for example, by logging in to the giver account using the giver's password. The payment mechanism may be associated with the account by being stored in association with the giver's account or the giver may choose to submit the payment mechanism information upon accessing the account. At 506, the system receives from the giver a name or other identifier associated with a recipient also holding an account with a network resource. The identifier may include an e-mail address used by the recipient and associated with the recipient's account or the identifier may include any other identifier that serves to identify the recipient to the network resource.

At 508, the system determines whether there is a wish list associated with the recipient's account. The recipient may have created one or more wish lists that identify electronically transferrable items or other items the recipient would like to receive. If the system determines at 508 that there is a wish list associated with the recipient's account, at 510, the system makes the wish list, that includes one or more desired electronically transferrable items included in the wish list, available to the giver. For example, the 230 may communicate data corresponding to the wish list to the 210, such as via a web server. In one embodiment, when the wish list is made available to the giver, a selection indicator is associated with one or more desired electronically transferrable items that may be included in the wish list. At 512, the system determines whether the giver has selected one of the desired electronically transferrable items by submitting a single input, such as by the giver manipulating an input device to choose a selection indicator associated with a desired electronically transferrable item. Because the giver has a payment mechanism associated with the giver's account and the recipient's account will be associated with information enabling the system to notify the recipient, a single input may be sufficient to complete the electronic gifting transaction.

At 514, the gift notification is generated for the recipient. At 516, the system determines whether the gift has been accepted. If so, at 518, the system charges the payment mechanism associated with the giver's account. At 520, the system sends confirmation to the giver for example, by sending confirmation data that the gift has been accepted. At 522, single input electronic gifting ends. However, if the system determines at 516 that the gift is not yet been accepted, the system may revert to 516 to await the recipient's acceptance of the gift. The recipient also may have the option of redirecting, exchanging, or refusing the gift as previously described with reference to FIG. 4.

Alternatively, if the system determines at 508 that there is no wish list associated with the recipient's account, single input electronic gifting ends at 522. Similarly, if the system determines at 512 that the giver has not selected an electronically transferrable item, again, single input electronic gifting ends at 522.

Figure 6:
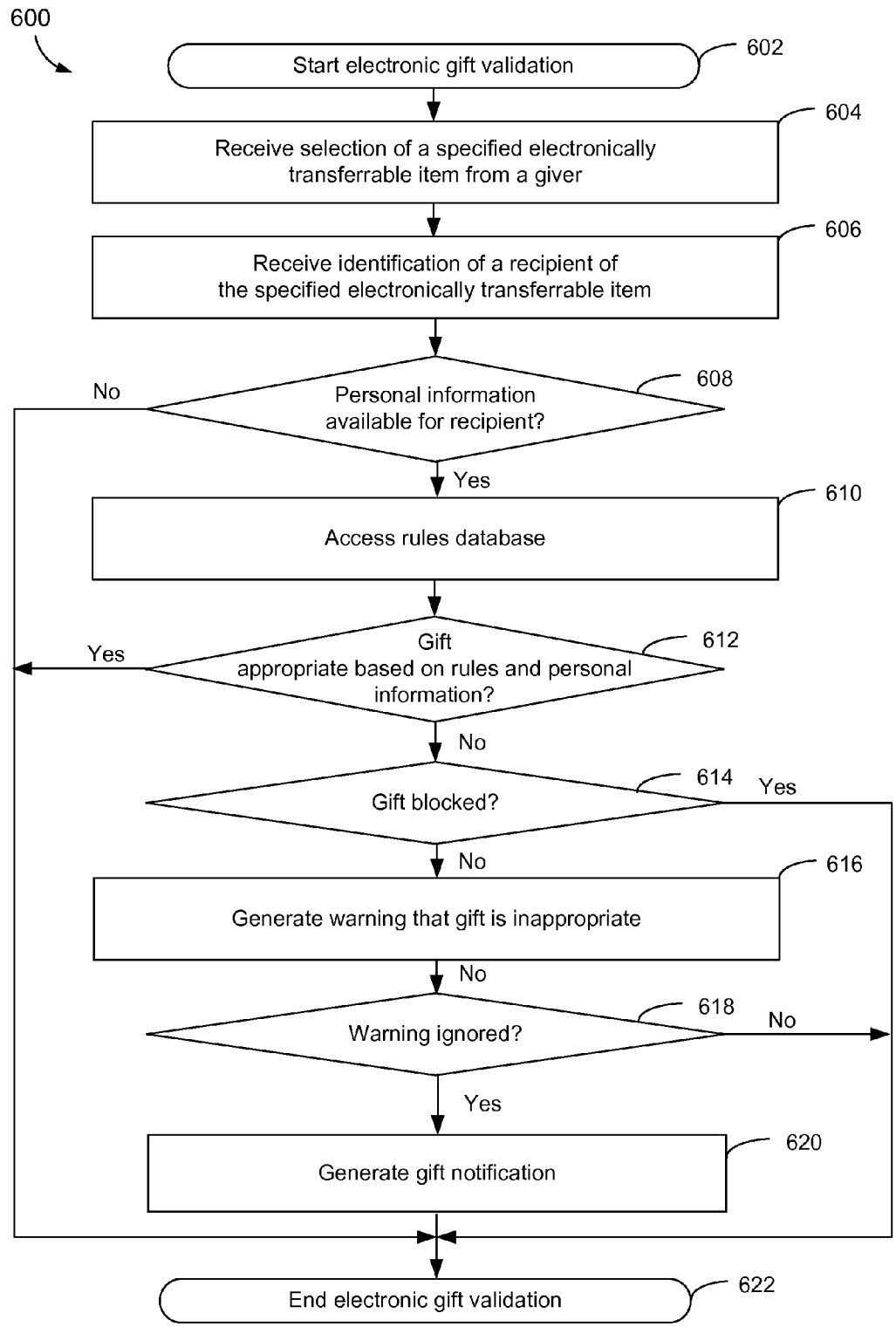
FIG. 6 is a flow diagram of an illustrative embodiment of a method of electronic gift validation to determine an appropriateness of a specified electronically transferrable item as a gift.

FIG. 6 is a flow diagram 600 of an illustrative embodiment of a method of electronic gift validation. Again, for purposes of illustration, it will be assumed that a system, such as the system 200 of FIG. 2, performs the method described by the flow diagram 600. As previously described, for purposes of illustration, it will be assumed that a system, such as the system 200 of FIG. 2, performs the method described by the flow diagram 600. However, differently configured systems also may be used to enable or perform the methods described by the flow diagram 600.

At 602, electronic gift validation begins. At 604, selection of a specified electronically transferrable item is received from the giver. For example, the selection may be received as data that is transmitted to the network resource 230 from the giver client computing system 210 as described with reference to FIG. 2. At 606, identification of a recipient of the specified electronically transferrable item is received. It should be noted that identification of the recipient or the selection of the specified electronically transferrable item may be performed in either order. It should also be noted that if the giver is accessing a recipient wish list, as described with reference to FIG. 5, the identity of the recipient may already have been identified to the system.

At 608, the system determines whether personal information is available for the recipient. If the recipient holds an account with a network resource from which the specified electronically transferrable item has been selected, the recipient may have provided some personal information to the network resource, such as the recipient's age or the recipient's residence address. If the system determines at 608 that no personal information is available, at 622, electronic gift validation ends. On the other hand, if the system determines at 608 that personal information is available for the recipient, at 610, the system accesses a rules data store. As previously described with reference to FIG. 2, a rules data store may include information about whether certain media is appropriate for various persons in various locations.

At 612, the system determines whether the gift is appropriate based on the rules and personal information previously obtained. For example, if the recipient resides in a location where a particular media format will not play on media players available in that location, the gift may be considered inappropriate. Similarly, if the recipient is a minor child, some songs, movies, games, or other electronically transferrable items may be considered age-inappropriate for the recipient. If the gift is considered appropriate for the recipient, at 620, the system generates a gift notification for the recipient and, at 622, electronic gift validation ends.

On the other hand, if the system determines at 612 that the gift is not appropriate based on the rules and personal information, the system determines at 614 whether the gift should be blocked. For example, if laws or other policies prevent the network resource from providing age inappropriate media to children of certain ages, laws or network resource rules may result in the gift being blocked. In this case, the gift is blocked at 614 and electronic gift validation ends at 622. On the other hand, if the system does not block the gift of 614, the system may generate a warning that the gift is inappropriate at 616. At 618, the system determines whether the giver has ignored the warning. If the system determines the giver has not ignored the warning, the gift transaction ends and electronic gift validation ends at 622. However, if the giver has determined to ignore the warning, at 620, the system generates a gift notification and electronic gift validation ends at 622.

It should be noted that electronic gift validation may be combined with other methods previously described. For example, electronic gift validation may be combined with the particular embodiment of electronic gifting described with reference to FIG. 3.

Figure 7:
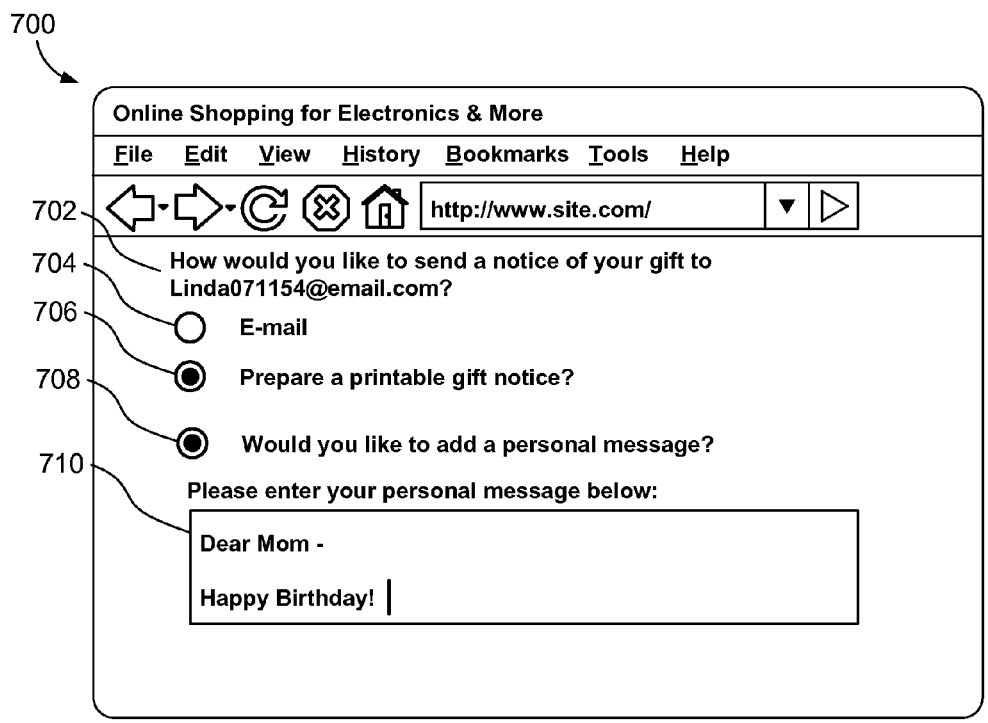
FIG. 7 depicts an illustrative embodiment of a user interface used in the generation of a gift notification for a specified electronically transferrable item to be presented as a gift.

FIGS. 7-12 depict user interfaces displayed to the giver or the recipient to further illustrate various embodiments previously described. FIG. 7 depicts a user interface 700 employed by a giver in selecting how a gift notification should be presented. A preference choice 702 asks the giver to select how the gift notification should be presented to a specified recipient who, in the example of FIG. 7, is identified by an e-mail address "Linda071154@email.com." The user interface 700 provides an e-mail option 704 and a printable gift notification option 706. The user interface 700 also provides a personal message option 708 and a personal message field 710 in which the giver may include a personal greeting for the recipient.

Figure 8:
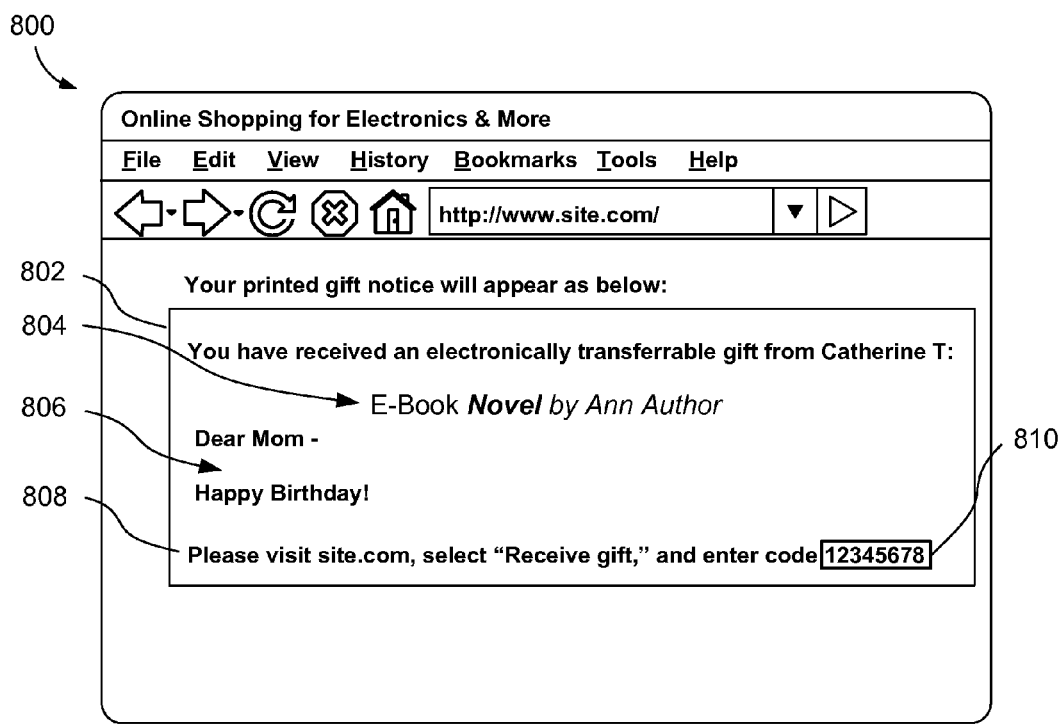
FIG. 8 depicts an illustrative embodiment of a user interface enabling a preview of a printable gift notification including a code provided as an access mechanism to receive the specified electronically transferrable item.

FIG. 8 depicts a user interface 800 providing a preview 802 of a printable gift notification that may be generated for the recipient. The preview 802 of the printable gift notification includes an identification of the specified electronically transferrable item 804 offered as the gift. In this example, the specified electronically transferrable item includes an electronic book (e-book). The preview 802 also includes a personal message 806 included by the giver. The preview 802 also includes instructions 808 explaining to the recipient how to accept the gift. The instructions 808 include the access mechanism 810 which, in this example, includes a numeric code to be submitted as explained in the instructions 808.

Figure 9:
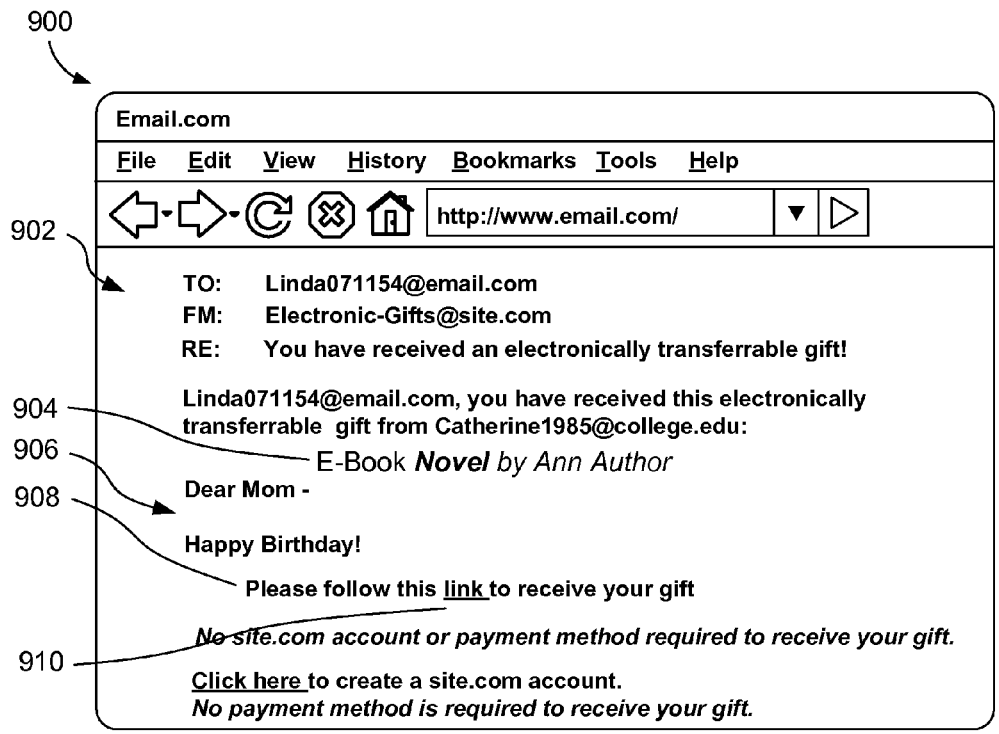
FIG. 9 depicts an illustrative embodiment of a user interface displaying an e-mail form of a gift notification including a link provided as an access mechanism to receive the specified electronically transferrable item.

FIG. 9 depicts a user interface 900 showing an electronic gift notification, in the form of an e-mail 902, sent to the recipient to notify the recipient of the gift. The e-mail 902 includes an identification of the specified electronically transferrable item 904 offered as the gift. The e-mail 902 also includes a personal message 906 included by the giver. The e-mail 902 also includes instructions 908 explaining to the recipient how to accept the gift. The instructions 908 specify the access mechanism, in the form of a link 910, that the recipient may select to access the network resource to accept the gift.

Figure 10:
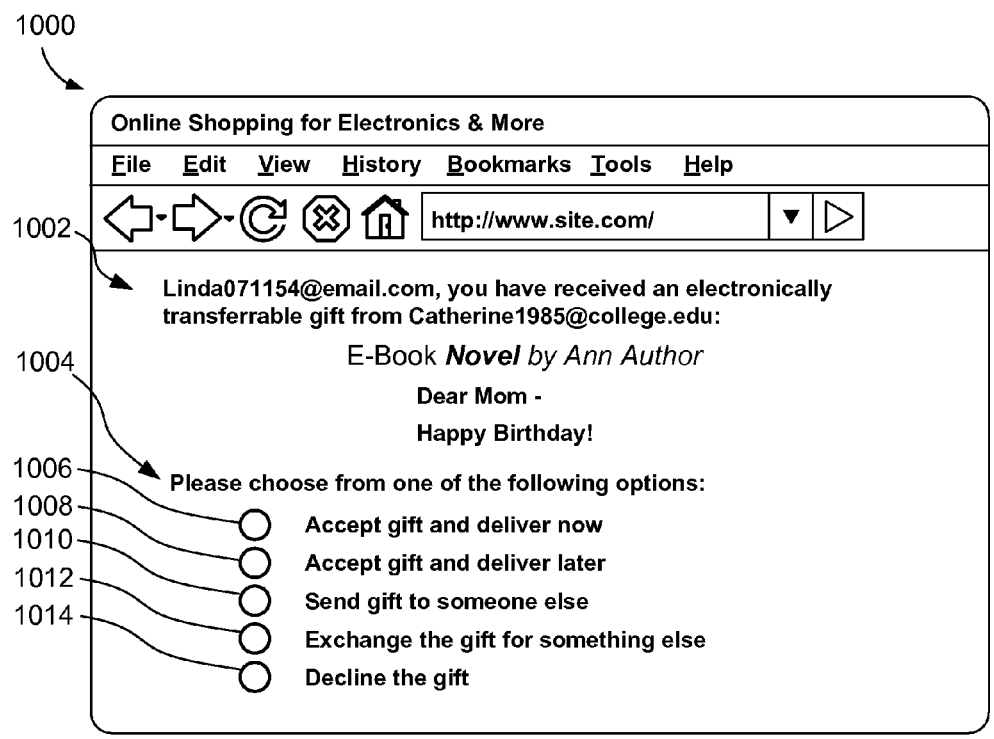
FIG. 10 depicts an illustrative embodiment of a user interface displaying a list of options for a recipient of a specified electronically transferrable item.

FIG. 10 depicts a user interface 1000 showing a response screen 1002 allowing the recipient to choose how to respond to the gift. The response screen 1002 includes a selection instruction 1004 that directs the recipient to choose among options 1006-1014. An accept and deliver now option 1006 enables the recipient to accept the gift and immediately initiate electronic delivery of the specified electronically transferrable item included in the gift. An accept and deliver later option 1008 enables the recipient to accept the gift, but to postpone electronic delivery of the specified electronically transferrable item until a later time. A redirect option 1010 enables the recipient to redirect the gift to a third party. An exchange option 1012 enables the recipient to exchange the specified electronically transferrable item included in the gift for another item of equal or lesser value or for a credit for the value of the specified electronically transferrable item. A decline option 1014 enables the recipient to refuse the gift.

Figure 11:
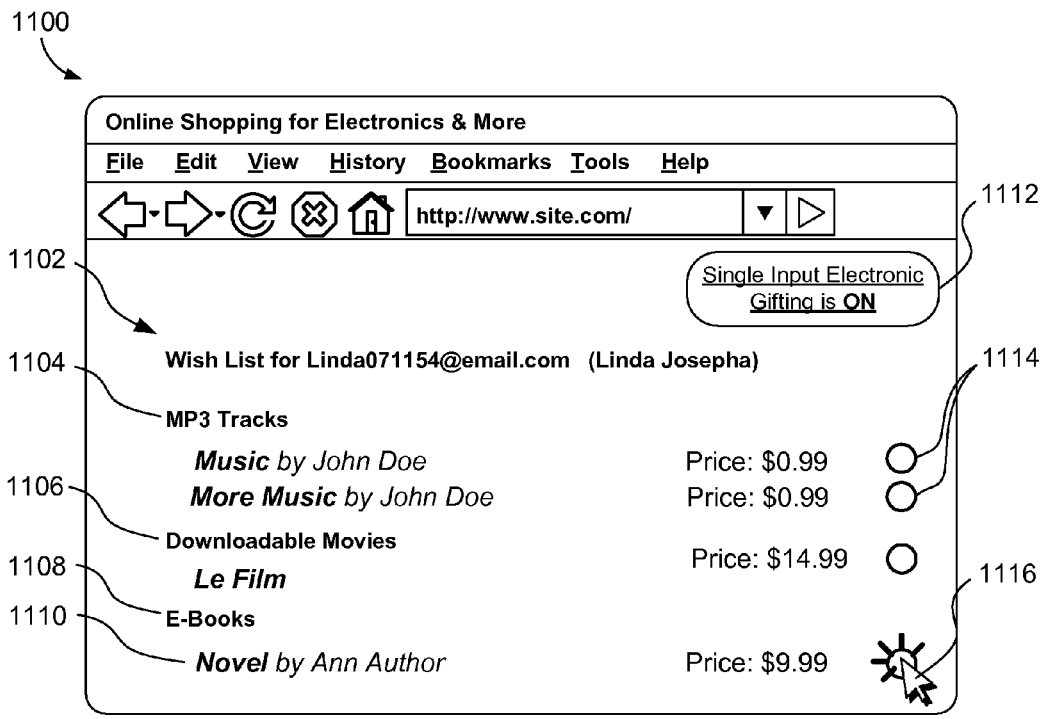
FIG. 11 depicts a wish list associated with an account with an electronic commerce (e-commerce) service maintained by a prospective gift recipient, with items in the wish list being associated with single input indicators for selected a specified electronically transferrable item to be presented as a gift.

FIG. 11 depicts a user interface 1100 showing a wish list screen 1102 that enables a giver to employ single input electronic gifting as previously described with reference to FIG. 5. The wish list screen 1102 includes a number of electronically deliverable electronically transferrable items divided into categories including MP3 tracks 1104, electronically-deliverable movies 1106, and e-books 1108. The giver chooses a specified electronically transferrable item 1110, an e-book, as a gift. The wish list screen 1102 includes an indicator 1112 that single input electronic gifting is turned on, and provides selection indicators 1114 with the electronically transferrable items indicating that each of the items may be selected for single input electronic gifting. The giver manipulates a cursor 1116 to select the selection indicator 1114 associated with a specified electronically transferrable item.

FIG. 12 depicts a user interface 1200 showing a single input electronic gifting confirmation message 1202. The confirmation message 1202 confirms the gift the giver has just made with single-input electronic gifting. In one embodiment, the confirmation message 1202 may include an identification of the specified electronically transferrable item 1204 and an identification of the recipient 1206. The confirmation message 1202 also may provide the giver with a choice 1208 to include a personal message by selecting an on-screen button 1210.

FIG. 13 shows a block diagram of a computing environment 1300 including a general purpose computer device 1310 operable to support particular embodiments of computer-implemented methods and computer-readable media according to the present disclosure. In a particular configuration, the computing device 1310 may include a server that is configured to enable selection of gifts, generation of gift notification, respond to acceptance of gifts, and enable electronic delivery of electronically transferrable items as previously described. The computing device 1310 typically includes at least one processing unit 1320 and system memory 1330. Depending on the exact configuration and type of computing device, the system memory 1330 may be volatile (such as random access memory or "RAM"), non-volatile (such as read-only memory or "ROM," flash memory, and similar memory devices that maintain the data they store even when power is not provided to them) or some combination of the two. The system memory 1330 may include computer readable media that is accessible to the processing unit 1320 and may include one or more computer program products that include instructions exceeded by the 1320, an operating system 1332, one or more application platforms such as an object-oriented platform 1334 such as Java, one or more applications 1336, and may include program data 1338.

The computing device 1310 may also have additional features or functionality. For example, the computing device 1310 may also include removable and/or non-removable additional data storage devices such as magnetic disks, optical disks, tape, and standard-sized or miniature flash memory cards. Such additional storage is illustrated in FIG. 13 by removable storage 1340 and non-removable storage 1350. Computer storage media may include volatile and/or non-volatile storage and removable and/or non-removable media implemented in any method or technology for storage of information such as computer-readable instructions, data structures, program components or other data. The system memory 1330, the removable storage 1340 and the non-removable storage 1350 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1310. Any such computer storage media may be part of the device 1310. The computing device 1310 may also have input device(s) 1360 such as a keyboard, mouse, pen, voice input device, touch input device, etc. Output device(s) 1370 such as a display, speakers, printer, etc. may also be included.

The computing device 1310 also contains one or more communication connections 1380 that allow the computing device 1310 to communicate with other computing devices 1390, such as a server, over a wired or a wireless network. The one or more communication connections 1380 are an example of communication media.

Not all of the components or devices illustrated in FIG. 13 or otherwise described in the previous paragraphs are necessary to support particular embodiments. For example, a handheld device may include a single system memory 1330 to store an operating system, one or more applications, and all program data. A compact device may or may not include removable storage 1350. In addition, the communication connection 1380 may include a Bluetooth® radio transceiver and/or a Universal Serial Bus (USB) connection port for backup, update, and networking functions.

The steps of a method or algorithm described in connection with the embodiments disclosed herein may be embodied directly in hardware, in a software component executed by a processor, or in a combination of the two. A software component may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an integrated component of a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A system, comprising:
   an electronic gift component, including:
      a processor configured to:
         enable a selection of a specified digital media item from a network resource, wherein the specified digital media item is electronically deliverable from the network resource to be presented as a gift to a recipient;
         generate a gift notification to be presented to the recipient, wherein the gift notification includes an access mechanism to enable a recipient to access the gift;
         wherein in response to the access mechanism, the processor is configured to enable acceptance of the gift and to make the gift available for electronic delivery;
         determine whether the gift has been accepted using the access mechanism;
         when the gift has not been accepted, enable the giver to cancel the gift such that no payment is processed; and
         when the determination is that the gift has been accepted, initiate payment by a payment mechanism associated with the giver; and
      a payment processing component configured to process the initiated payment.

2. The system of claim 1, wherein the processor is configured to generate the gift notification by at least one of:
   sending an electronic message to the recipient; and
   generating a printable message to be deliverable physically to the recipient.

3. The system of claim 1, wherein the access mechanism includes at least one of:
   a link that directs the recipient to a location of the network resource; and
   a code that the recipient can submit to the network resource.

4. The system of claim 1, wherein the processor is configured to make the gift available for delivery to the recipient without requiring the recipient to hold an account with the network resource.

5. The system of claim 1, wherein the processor is configured to make the gift available as a one-time electronic delivery.

6. The system of claim 1, wherein the processor is responsive to a selection by the recipient of an acceptance option, wherein the selected acceptance option includes at least one of:
   accepting the specified digital media item for immediate delivery;
   accepting the specified digital media item for subsequent delivery;
   refusing the specified digital media item;
   forwarding the specified digital media item to another party; or
   exchanging the specified digital media item.

7. The system of claim 1, wherein the processor is further configured to send a confirmation message for acceptance of the gift.

8. The system of claim 1, wherein the processor is further configured to:
   receive an identifier of the recipient; and
   when the identifier is associated with an existing account of the network resource, examine a data record related to the existing account.

9. The system of claim 8, wherein the processor is further configured to determine whether the data record includes a wish list that includes at least one desired digital media item identified by the recipient.

10. The system of claim 9, wherein the processor is further configured to enable selection of the at least one desired digital media item as the gift via a single input.

11. The system of claim 8, wherein the processor is further configured to access a rules data store to retrieve one or more rules to limit selection of the specified digital media item, wherein the processor uses the one or more rules to:
    determine if the gift is appropriate for the recipient based on the data record; and
    when it is determined that the gift is not appropriate for the recipient, to prevent access to the gift by the recipient.

12. The system of claim 11, wherein the processor is further configured to:
    prevent generation of the notification of the gift so that the access mechanism is not provided to the recipient; and
    generate a warning that the gift is not appropriate for the recipient.

13. The system of claim 11, wherein the processor is further configured to determine that the gift is not appropriate for the recipient when based at least in part on the data record for the recipient and the one or more rules in the rules data store, at least one of:
    a media format of the gift is incompatible with a format used in a location where the recipient resides;
    providing the gift to the recipient would violate one or more laws; and
    providing the gift to the recipient would violate one or more network-based rules.

14. The system of claim 1, wherein the processor is further configured to receive an input to direct the gift to multiple recipients.

15. The system of claim 14, wherein the processor is further configured to:

receive an acceptance limit indicating how many of the multiple recipients can accept the gift, and enable a number of the multiple recipients up to the acceptance limit to receive the gift.

16. A computer-implemented method to enable selection of an electronically transferrable item that is electronically deliverable from a network resource to be presented as a gift, the computer-implemented method comprising:

obtaining a selection of an electronically transferrable item that is electronically deliverable from a network resource to be presented as a gift to a recipient from a giver;

generating a gift notification to be presented to the recipient, wherein the gift notification includes an access mechanism to enable the recipient to accept the gift as a one-time delivery without requiring the recipient to hold an account with the network resource;

determining whether the gift has been accepted using the access mechanism;

when the determination is that the gift has not been accepted, enabling the giver to cancel the gift such that no payment is processed; and when the determination is that the gift has been accepted, initiating payment by a payment mechanism associated with the giver.

17. The method of claim 16, further comprising providing a delivery option to enable the recipient to select between an immediate delivery and a subsequent delivery.

18. The method of claim 16, further comprising, after the gift has been accepted, notifying the giver that the gift has been accepted.

19. A non-transitory computer-readable medium having computer-executable components, the computer-executable components comprising:

an electronic gift component configured to enable a client computing system operated by a giver to access a network resource to select a gift for a recipient from a wish list of the recipient, wherein:
both the giver and the recipient hold accounts with the network resource;
a giver account is associated with a payment mechanism; and
the wish list is associated with a recipient account and includes at least one electronically transferrable item electronically deliverable from the network resource;

a selection component configured to make the wish list available to the giver as a list of selectable gift options, wherein a selection indicator is associated with the at least one electronically transferrable item, and wherein the selection component is further configured to determine when a single input is received from the giver to select the at least one electronically transferrable item as the gift;

a gift notification component configured to send a notification to the recipient of the gift;

an acceptance component configured to receive an input from the recipient to accept the gift, wherein the acceptance component is further configured to receive an instruction from the giver to cancel the gift before the recipient accepts the gift; and a payment processing component configured to charge the payment mechanism of the giver after the recipient accepts the gift;
wherein no payment is processed by the payment processing component if the acceptance component receives an instruction from the giver to cancel the gift.

20. The non-transitory computer-readable medium of claim 19, wherein the selection component is further configured to receive an e-mail address of the recipient and to retrieve the wish list based on the e-mail address.

21. The non-transitory computer-readable medium of claim 19, wherein the acceptance component is further configured to provide an access mechanism to the recipient to enable the recipient to accept the gift, wherein the access mechanism includes one of:
a code presentable to the network resource; and
a link to the network resource.

22. The non-transitory computer-readable medium of claim 19, wherein the acceptance component is further configured to enable the recipient to refuse the gift, such that the payment mechanism of the giver is not charged for the gift.

23. The non-transitory computer-readable medium of claim 19, wherein the acceptance component is further configured to enable the recipient to at least one of:
forward the gift to a third party;
exchange the gift for another item; and
exchange the gift.

24. A non-transitory computer-readable medium having computer-executable components, the computer-executable components comprising:

an acceptance component configured to receive an access mechanism enabling a recipient to accept a gift that includes a specified electronically transferrable item that is electronically deliverable from a network resource, wherein the acceptance component is further configured to determine when the recipient has accepted the gift, wherein the acceptance component is further configured to receive an instruction from a giver of the gift to cancel the gift before the recipient accepts the gift; and a payment processing component configured to charge a payment mechanism associated with the giver of the gift when the recipient has accepted the gift;
wherein no payment is processed by the payment processing component if the acceptance component receives an instruction from the giver to cancel the gift.

25. The non-transitory computer-readable medium of claim 24, wherein the acceptance component is further configured to:
identify one or more users of the network resource for whom the recipient has authorized automatic delivery of electronically transferrable items sent by the one or more users; and
automatically perform the electronic delivery of the gift when the identified one or more users includes the giver.

26. A system comprising:
a data store that stores electronically transferrable items available to be purchased as gifts;
a computing device in communication with the data store, the computing device operative to:
receive a selection by a giver of a specified electronically transferrable item to be presented to a recipient as a gift;
generate a gift notification to be presented to the recipient, wherein the gift notification includes an access mechanism to enable the recipient to accept the gift;
determine whether the gift has been accepted using the access mechanism;
when the gift has not been accepted, enable the giver to cancel the gift such that no payment is processed; and when the determination is that the gift has been accepted, initiate payment by a payment mechanism associated with the giver.

27. The system of claim 26, wherein the access mechanism includes at least one of:

a link that directs the recipient to the computing device; and a code that the recipient can submit to the computing device.

\* \* \* \* \*